United States Patent
Barrick, Sr. et al.

[15] 3,692,327
[45] Sept. 19, 1972

[54] PASSENGER EMBRACING SAFETY NETS FOR USE WITH AUTOMOTIVE VEHICLES

[72] Inventors: Thomas W. Barrick, Sr.; Billie L. Barrick, both of 737 Piedmont Ave., Portland, Oreg. 97304

[22] Filed: June 23, 1971

[21] Appl. No.: 155,772

[52] U.S. Cl.............................280/150 B, 296/84 K
[51] Int. Cl..............................................B60r 21/10
[58] Field of Search.................280/150 B; 296/84 K

[56] References Cited

UNITED STATES PATENTS

| | | | |
|---|---|---|---|
| 2,025,822 | 12/1935 | Pryor | 280/150 B |
| 2,778,896 | 1/1957 | Tollefsen | 280/150 B X |
| 2,833,554 | 5/1958 | Ricordi | 280/150 B |
| 3,077,355 | 2/1963 | Santesso | 280/150 B |
| 3,494,633 | 2/1970 | Malloy | 280/150 B |

FOREIGN PATENTS OR APPLICATIONS 539,705    7/1955    Belgium..............280/150 B

*Primary Examiner*—Leo Friaglia
*Attorney*—James D. Givnan

[57] ABSTRACT

A generally rectangular restraining member or members for occupants of the front and/or rear seats of a passenger vehicle. Each restraining member comprises a frame, including a protective curtain, preferably pivotally attached to the underside of the roof of a vehicle and so arranged that on sudden deceleration of vehicle momentum or at the moment of collision impact, said restraining members will be unlatched from their normal overhead positions and automatically swung downwardly to draw the protective curtain or screens into body embracing engagement to hold the passenger safely against forward thrust and injurious impact with the windshield.

6 Claims, 12 Drawing Figures

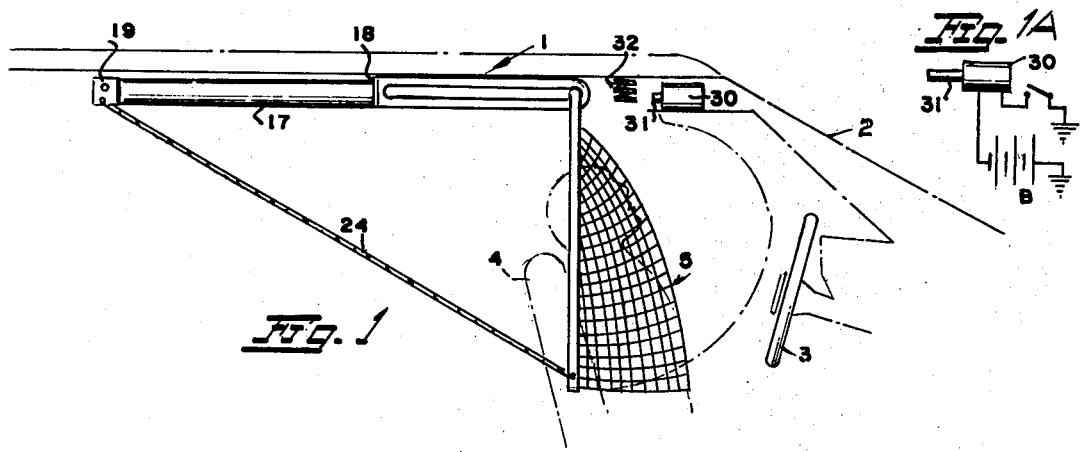
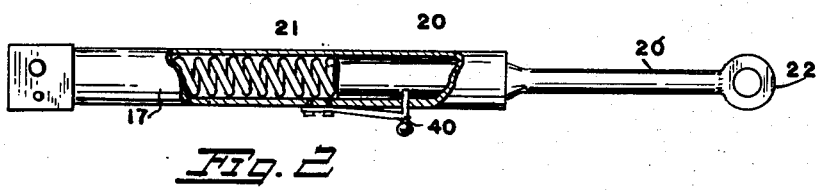
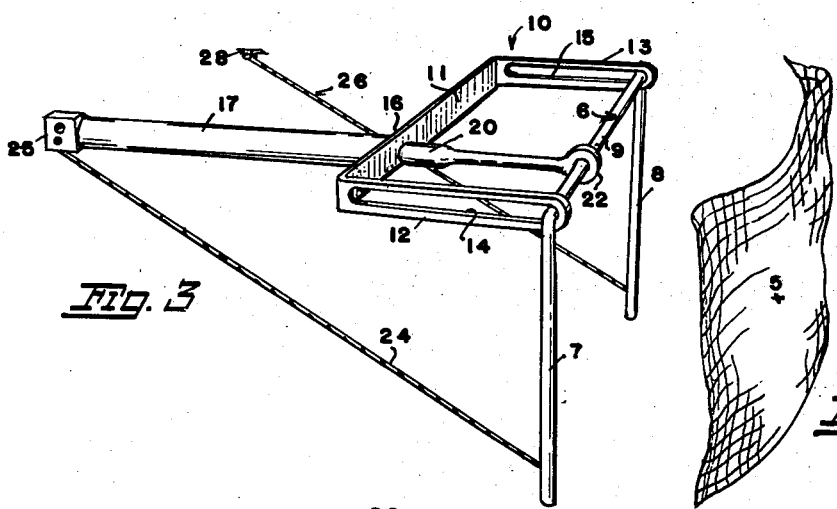
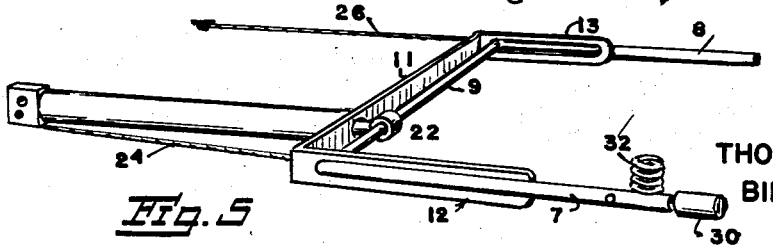
THOMAS W. BARRICK, Sr
BILLIE L. BARRICK
INVENTOR.
BY James D. Girman
ATT'Y PATENTED SEP 19 1972
3,692,327
SHEET 2 OF 3
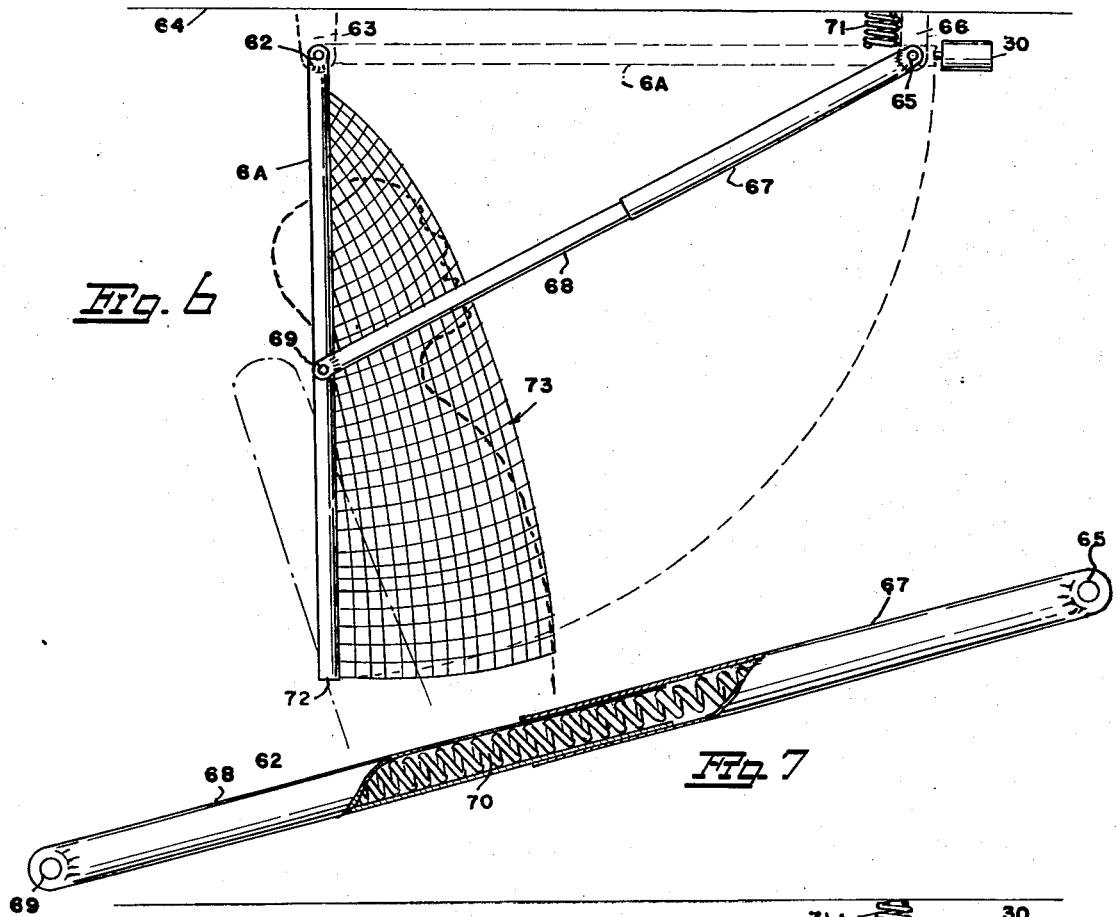
Fig. 6
Fig. 7
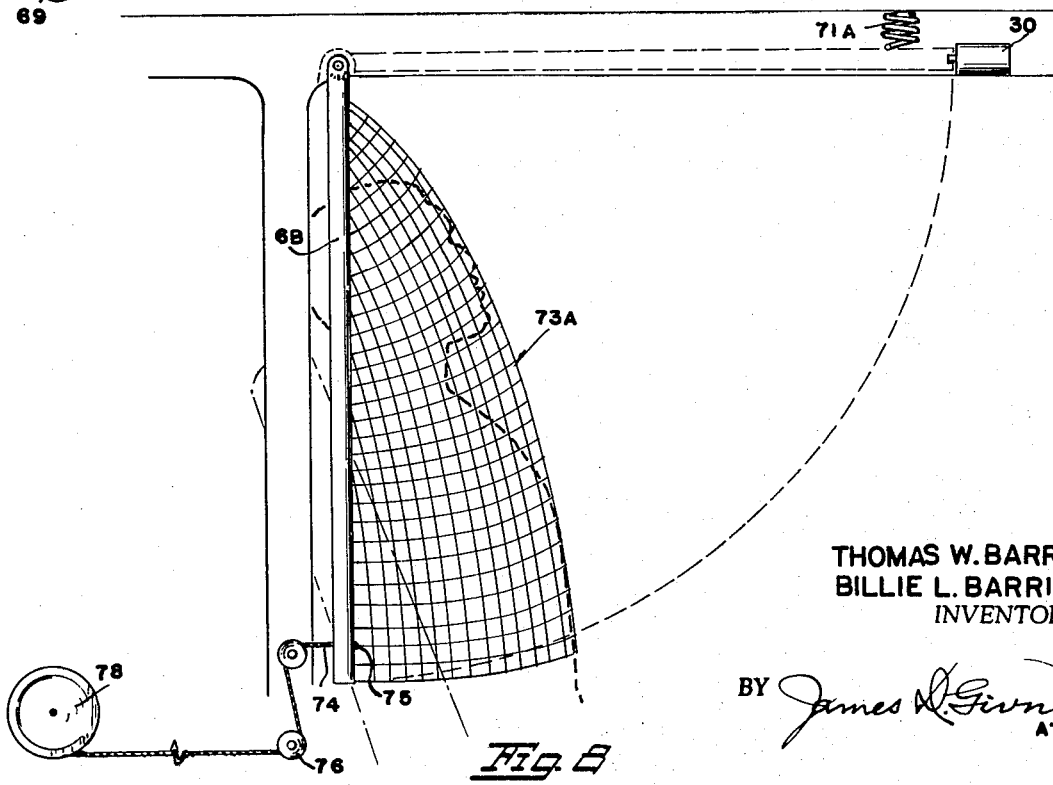
Fig. 8
THOMAS W. BARRICK SR
BILLIE L. BARRICK
INVENTOR.
BY James D. Givnan
ATT'Y INVENTOR.
THOMAS W. BARRICK, Sr
BILLIE L. BARRICK
BY James S. Girman
ATT'Y 3,692,327

PASSENGER EMBRACING SAFETY NETS FOR USE WITH AUTOMOTIVE VEHICLES

This invention relates to improvements in safety devices for occupants of passenger carrying vehicles and comprises essentially identical protective curtains or screens carried by frame members normally held up against the underside of the roof of the vehicle and instantly releasable to gravitate downwardly to embrace a passenger for holding him firmly and safely seated.

The objects of the invention are:

To provide a device of the character described which comprises a plurality of identical frame members inexpensively made in a common bending jig, and including identical protective screens secured to the frames.

To provide simplified means for instantly releasing the device from an inoperative overhead position to a downward operative passenger embracing position without interfering with the arms, hands or legs of the vehicle occupant.

To provide a device of the character described which comprises a minimum number of parts and readily adaptable for attachment to the underside of the roof top of any passenger carrying vehicle.

The foregoing and other objects and advantages which will become subsequently apparent reside in the details of construction and operation as more fully hereinafter described and claimed, reference being had to the accompanying drawings forming a part hereof and in which:

FIG. 1 is a fragmentary diagrammatic side elevational view of a vehicle body showing passenger restraining means operatively secured to the underside of the vehicle top and swingable downwardly into a passenger embracing position.

FIG. 1A is a detail view of a switch activated solenoid and wiring diagram.

FIG. 2 is a side elevational detail view, on a slightly enlarged scale, of a spring-backed connecting rod, and its housing, with a fragment broken away to reveal internal parts.

FIG. 3 is a perspective view of the structural components of the restraining device illustrated in FIG. 1.

FIG. 4 is a perspective detail view of a safety curtain made of elastic fabric adapted for securement to the restraining device and shown removed therefrom.

FIG. 5 is a view similar to FIG. 3 showing the restraining device in a retracted position.

FIG. 6 is a view similar to FIG. 1 showing a modified form of the invention.

FIG. 7 is a view similar to FIG. 2 showing a modified form of that disclosure.

FIG. 8 is a view similar to FIG. 6 showing a modification thereof.

Figure 9:
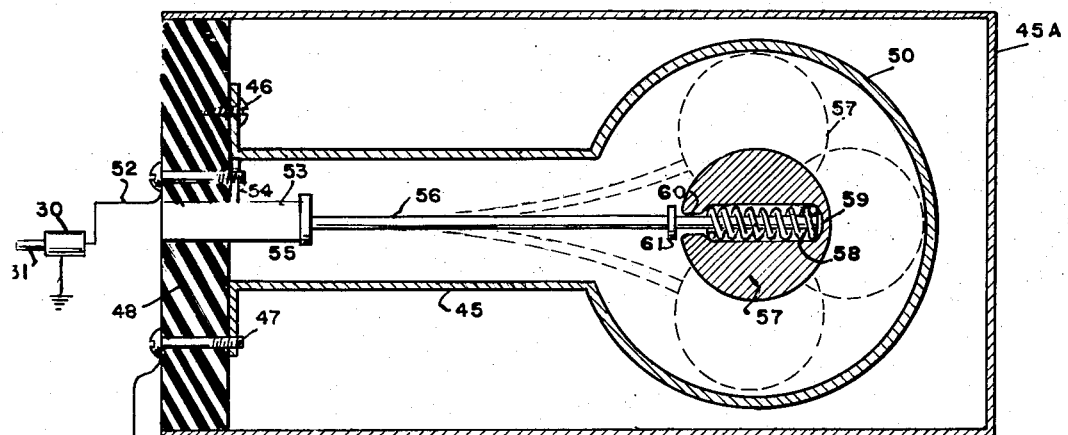
FIG. 9 is a detail plan view on an enlarged scale of an inertia switch adapted for inclusion in the circuitry shown in FIG. 1A.
Figure 10:
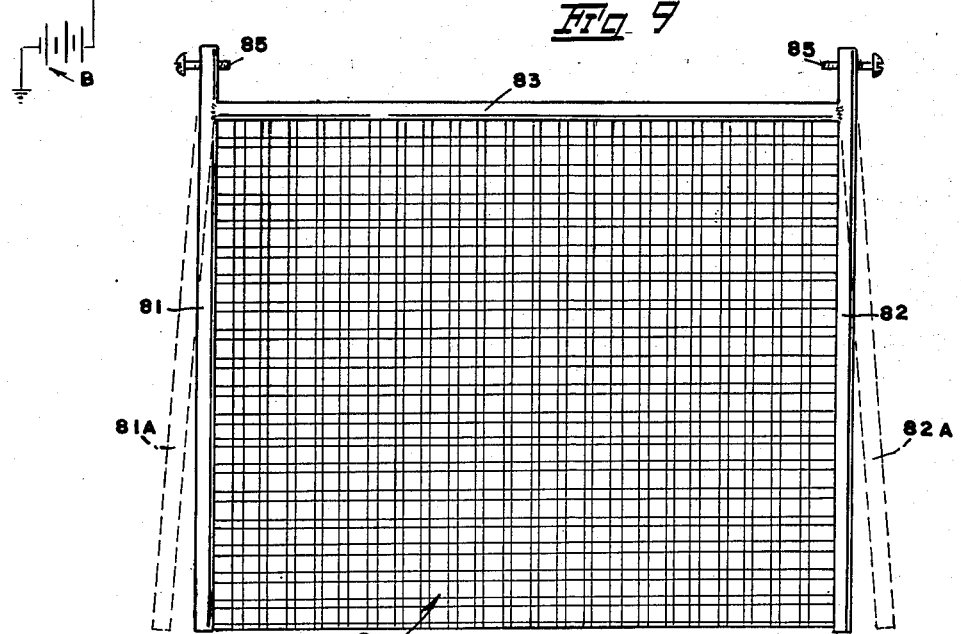
FIG. 10 is an elevational view of a modified form of supporting frame for the passenger restraining curtain.
Figure 11:
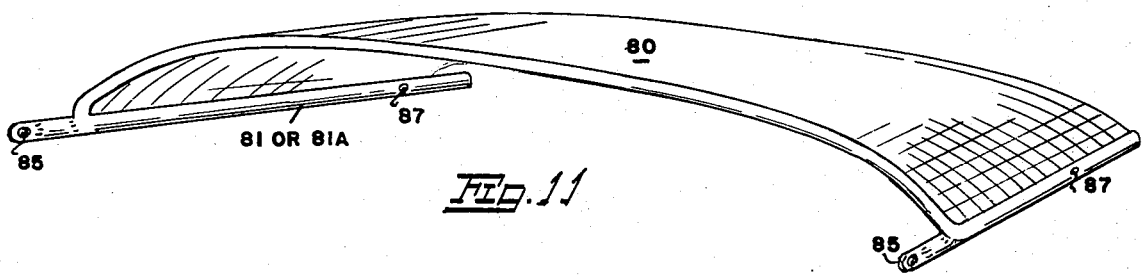
FIG. 11 is a perspective detail view of FIG. 10 in an elevated position.

With continuing reference to the drawings wherein like reference numerals designate like parts, and particularly FIGS. 1–5 thereof, numeral 1 indicates generally the top or roof of a passenger vehicle; 2, the windshield thereof; 3, the steering wheel; 4, the usual seat backrests; and 5, a safety curtain made in accordance with our invention.

The safety curtain 5 is preferably, though not restrictively, made of elastic fabric of a mesh to provide the necessary holding power against forward momentum of a passenger's body upon vehicle collision, but of a mesh of such size as to not impair the passenger's vision.

The mesh in sheet form, as illustrated in FIG. 4, is secured along both of its sides and secured in any suitable manner to an inverted U-shaped frame indicated generally at 6 and comprising parallel leg members 7–8 and a cross member 9, preferably made of a single length of lightweight steel tubing by means of a bending jig.

The frame 6 is carried by a frame, generally indicated at 10, comprising a back wall 11 made integral with forwardly extending arms 12 and 13 slotted substantially throughout their length as at 14 and 15, respectively, to provide a sliding support for the frame 6 and its curtain 5. The frame 10 is secured in any suitable manner as at 16 to the forward end of a cylinder 17, which is secured in any suitable manner such as at 18–19 to the underside of the roof 1 of the vehicle.

A connecting rod 20 backed by compression spring 21 is slideably mounted within the cylinder 17, extends outwardly therefrom and terminates in a ring 22 connected to the cross-member 9 of U-shaped frame 6 as shown in FIG. 3. Connected in any suitable manner to the bottom end of leg 7 of frame 6 is one end of an elastic nylon cord 24 or the like whose opposite end may be connected to the roof by a block 25 at the rearward end of the cylinder 17. One end of a companion cord 26 is similarly connected to the bottom end of the leg 8 of frame 6, with its opposite end secured as at 28 to the underside of the roof of the vehicle.

Mounted to the underside of the roof 1 in any suitable manner is a solenoid 30 provided with a core or armature 31.

Also secured to the roof 1 and depending therefrom is at least one compression spring 32 arranged in the line of forward thrust of the leg 7 of the inverted U-shaped frame 6. The leg 7 of frame 6 is of tubular form so that its bottom end (FIG. 5) is adapted to receive the core or armature 31 of the solenoid 30 when the solenoid is de-energized and will thus hold the frame 6 in the horizontal position shown in FIG. 5 against the reaction of the downward pressure of the compression spring 32.

From the foregoing, it will be apparent that when the leg 7 and hence the frame 6 itself is freed from the solenoid 30, the compression spring 21 within the cylinder 17 will force the connecting rod forwardly which, through the medium of its connection at 22 with the cross member 9 of frame 6, will force the frame forwardly into the position shown in FIG. 1 which will allow the elastic nylon cords 24 and 26 to pull the frame 6 into its downward position shown in FIGS. 1 and 3 and thereby enclose the passenger within the safety net 5.

In the neutral or inoperative position of the device, the frame 10 is held in the normal position by the rearward pull of the connecting rod 20 when released by the detent 40 by the rearward action of tension spring 21. Such rearward movement of the rod 20 throughout the medium of its connection 22 to the cross member 9 of the frame 6 will pull the frame rearwardly along the slots 14 and 15 in the arms 12 and 13. When cross member 9 reaches the end of such rearward movement, the legs 7-8 of the frame will be put into alignment with the solenoids 30 so that their armatures 31 will be forced into the hollow tubular ends of the legs 7-8 and fixedly hold the frame 6 and its related parts in this inoperative position.

In the modified form of the invention shown in FIG. 6, 7 and 8, the frame 6A is swingably attached as at 62 at its top end to a hanger 63 secured to and depending from the roof 64 of the vehicle. The frame is thus free to swing downwardly from the broken horizontal line position to the full line vertical position. Pivotally attached as at 64 to a hanger 66 is one end of a hollow tubular member 67 with which is telescopically engaged a second tubular member 68 pivotally attached at its outer end as at 69 to the member 68. As best shown in FIG. 7, a tension spring 70 is enclosed within the tubular members 67-68 and is secured in any suitable manner to the outer ends of said telescopic members.

As in other forms of the invention a compression spring 71 is suspended from the roof 64 of the vehicle so that when the armature of the solenoid 30 is withdrawn from the open bottom end 62 of the leg or legs of the frame 6A, the frame will be pulled downwardly by the tension of the spring 70 into the position shown to embrace the body of the vehicle occupant with the protective shield 63.

In the further modification shown in FIG. 8, I dispense with the compression spring 70, the retractable telescopic tubular members 67-68, and instead rely upon a pull cord 74 secured as at 75 to the bottom end of the hollow tubular leg member of the frame 6B and entrained over idling pulleys 76 and wound about a spring loaded torque-driven pulley 78. Accordingly, when the solenoid 30 is energized and its armature is retracted as shown, the frame 6B and the protective shield 63A will be pulled downwardly into protective covering of the vehicle passenger by tension applied to the pull cord 64.

Any modified form of protective shield 80 is carried by two hollow tubular leg members 81 and 82 connected by a cross bar 83 and provided with hinge bolts 85 at their top ends for swingable attachment to any suitable fixture or hangers depending from the roof of the vehicle.

The leg members 81A and 82A shown in broken lines diverge outwardly toward their bottom ends to provide wider coverage for passengers in a seat or seats rearward of the front seat.

The legs 81 and 81A are apertured as at 87 for attachment to elastic pull cords as in the other forms of the invention.

With reference to the inertia switch shown in FIG. 9, we provide a housing 45A mounted at one of its ends by screw fasteners 46 and 47 to a base of dielectric material 48. The free end of housing 45 is enlarged into globular form as at 50 and by means of screw fastener 46 is connected as at 51 to one side of a battery B whose other side is grounded as shown. One side of solenoid 30 is grounded as shown and its opposite side connected as at 52 to a screw fastener or binding post 53 connected by a wire 54 to a base 55 for one end of a spring rod 56. The opposite or free end of spring rod 56 whose free end terminates within a metallic spherical member 57 by means of a bore 58 therein which is closed at one end 59 and whose opposite end has a reduced opening 60 to provide a limit stop for a washer 61 secured to rod 56.

From the foregoing, it will be apparent that upon collision impact from any direction, the spherical member 57 at the end of the resilient rod 56 will swing in the opposite direction—that is to say forwardly or to either side as shown in FIG. 9—and thereby close the electric circuit through the housing 50, 45, 47 and wire 51 to one side of battery B through the ground connection thereof and that of the solenoid 30, through the solenoid and by wire 52 and binding post 53 and connection 54 to the base of the rod 56. The resultant energization of solenoid 30 will retract its armature 31 from its extended position shown in FIG. 1A to that shown in FIG. 1 and out and away from the hollow bottom ends of the tubular leg member or members 7 or 8 of the inverted U-shaped 6, thus subjecting the frame to downward pressure by the spring 32 into the position shown in FIG. 3.

What we claim is:

1. A safety device for passengers of a vehicle having a roof and at least one seat,
    said device comprising a horizontally disposed frame fixedly secured to the underside of said vehicle top,
    said frame comprising a back wall integral with forwardly extending parallel arms slotted substantially throughout their length,
    a cylinder having a forward end fixedly secured to said frame wall member,
    the rearward end of said cylinder secured to said underside of said roof,
    a U-shaped frame comprising two hollow leg members integral with a cross member,
    a safety curtain of mesh material carried by said U-shaped frame,
    a piston rod carried by said cylinder, extending forwardly therefrom and pivotally attached to said cross member of said U-frame,
    a compression spring enclosed within said cylinder between the inner end of said piston and the rear end wall of said cylinder,
    a solenoid having an armature normally extending into the open end of one of said legs of said U-shaped frame,
    said solenoid in circuit through an impact switch with a source of electric current whereby armature withdrawal from said frame leg will release said frame and safety curtain to gravitate downwardly to embrace a passenger.

2. A safety device as claimed in claim 1 including elastic pull cords connected at their forward ends to the open end of the legs of said U-shaped member and at their opposite ends to said roof of the vehicle.

3. A safety device as claimed in claim 1 including electrically actuated latching means carried by said roof of the vehicle and operable upon vehicle impact into engagement with the open end of one of said legs of said U-shaped member.

4. A safety device as claimed in claim 1 including at least one compression spring interposed between one hollow leg of said U-shaped member and said roof of the vehicle.

5. A safety device as claimed in claim 1 including telescopic struts interconnecting said U-shaped frame and said roof of the vehicle.

6. A safety device as claimed in claim 1 wherein said impact switch includes an external cylindrical housing sealed at one of its ends by a plate of dielectric material, a hollow tubular metallic switch housing secured at one of its ends to said seal for the housing, the opposite end of said tubular housing enlarged into globular form, said internal housing in electric circuit through a source of electric current to a ground connection, a spring rod secured at one of its ends to said sealed end of said cylinder and in electric circuit with one side of a solenoid having an electrically actuated armature, the opposite side of said solenoid having a ground connection, the opposite end of said spring rod terminating within said globular portion of said inner housing and thereat provided with a metallic spherical member whereby said ball member will swing in a direction opposite to that of the line of impact and into contact with said internal tubular housing to thereby close the electric circuit to said solenoid to actuate the same.

* * * * *